United States Patent Office 3,738,998
Patented June 12, 1973

3,738,998
DECARBAMOYLMITOSANES
Keizo Uzu, Kinichi Nakano, and Toshinaka Takahashi, Tokyo, Japan, assignors to Kyowa Hakko Kogyo Kabushiki Kaisha, Tokyo-to, Japan
No Drawing. Original application Apr. 8, 1969, Ser. No. 814,278, now Patent No. 3,627,781. Divided and this application Apr. 9, 1971, Ser. No. 132,893
Claims priority, application Japan, Apr. 11, 1968, 43/23,704, 43/23,705, 43/23,706; May 2, 1969, 44/29,122
Int. Cl. C07d 27/36
U.S. Cl. 260—326.3                        3 Claims

ABSTRACT OF THE DISCLOSURE

Compounds of the formula and processes for their preparation are provided wherein X is methoxy or amino, Y is methoxy, hydroxy or hydrogen when $R_1$ is hydrogen and methoxy or hydroxy when $R_1$ is $R_2CO$, Z is hydrogen or methyl when $R_1$ is hydrogen and methyl or $R_2CO$ when $R_1$ is $R_2CO$, $R_1$ is hydrogen or $R_2CO$ and $R_2$ is lower alkyl. These compounds are antibiotics and, additionally, find use in treating tumors.

---

This application is a division of co-pending application Ser. No. 814,278, filed Apr. 8, 1969, now U.S. Pat. No. 3,627,781.

BACKGROUND OF THE INVENTION AND DESCRIPTION OF THE PRIOR ART

Mitomycins of the formula (I)

wherein X is methoxy or amino, Y is methoxy or hydroxy and Z is hydrogen or methyl are known antibiotics and, additionally, find use in treating tumors. These mitomycins, however, are strongly toxic and have undesirable side effects.

DESCRIPTION OF THE INVENTION

An object of the present invention is the provision of derivatives of mitomycins of Formula I which are less toxic and have fewer undesirable side effects than the mitomycins of Formula I and which are effective antibiotics and which have additional use in treating tumors. A further object of the present invention is the provision of processes for preparing these derivatives of mitomycins of Formula I.

The $CH_2OCONH_2$ group at the 9-position of the mitomycins of Formula I has previously been regarded as an essential group with respect to the activity of the mitomycins. It has now been found, however, that this group may be replaced by other groups falling within the scope of the present invention to provide derivatives of mitomycins of Formula I which are effective antibiotics and which have additional use in treating tumors.

According to the present invention, derivatives of mitomycins of Formula I of the formula (II)

and processes for their preparation are provided wherein X is methoxy or amino, Y is methoxy, hydroxy or hydrogen when $R_1$ is hydrogen and methoxy or hydroxy when $R_1$ is $R_2CO$, Z is hydrogen or methyl when $R_1$ is hydrogen and methyl or $R_2CO$ when $R_1$ is $R_2CO$, $R_1$ is hydrogen or $R_2CO$ and $R_2$ is lower alkyl. These derivatives of mitomycins of Formula I are generically referred to herein as decarbomoylmitosanes.

According to the first aspect of the invention, decarbamoylmitosanes of the formula (III)

are provided wherein X is methoxy or amino, Y is methoxy, hydroxy or hydrogen and Z is hydrogen or methyl.

According to the second aspect of the invention, a process for preparing decarbamoylmitosanes of Formula III wherein X is methoxy or amino, Y is methoxy or hydroxy and Z is hydrogen or methyl is provided wherein a mitomycin of Formula I is reacted with alkali to produce a decarbamoylmitosane of the formula (IV)

wherein Y is methoxy or hydroxy and Z is hydrogen or methyl. The 7-hydroxy group of the decarbamoylmitosane of Formula IV is converted to a methoxy group by methylation. The methoxy group at the 7-position of the decarbamoylmitosane may then be converted to an amino group by reaction with ammonia.

Japanese patent publication No. 22,380/67 discloses a process for preparing a mitomycin of the formula (V)

wherein Y is methoxy or hydroxy and Z is hydrogen or methyl by reacting a mitomycin of Formula I in the presence of alkali. It has now been found that a decarbamoylmitosane of Formula IV can be prepared by reacting a mitomycin of Formula I with alkali employing a higher concentration of alkali and a longer reaction time than specified in Japanese patent publication No. 22,380/67.

According to the second aspect of the invention, the reaction is preferably carried out in the presence of water or aqueous alcohol. Preferred alkali concentrations and corresponding reaction times are set-forth in Table 1:

TABLE 1

| Alkali concentration: | Corresponding reaction time, hours |
|---|---|
| 0.2 N | 16 |
| 0.5 N | 3–4 |
| 1.0 N | 2 |

Diazomethane is preferably employed to methylate decarbamoylmitosanes of Formula IV which are very unstable in the free form and convert them into a decarbamoylmitosane of Formula III wherein X is methoxy, Y is methoxy or hydroxy and Z is hydrogen or methyl. To accomplish methylation, Dry Ice in excess of the quantity necessary to neutralize the solution is first added to the alkali-hydrolyzed solution of the decarbamoylmitosane of Formula IV to neutralize excess alkali. The solution is then concentrated in vacuo and the pH of the residue is adjusted to 3.0–4.0 by adding acid. The resultant mixture is extracted with ethyl acetate and the extract is combined with a methylating solution such as diazomethane in ether. Methylation is accomplished and the hydroxy group at the 7-position of the decarbamoylmitosane of Formula IV is converted to methoxy. Since some mitomycin of Formula I wherein X is methoxy is present in the alkali-hydrolyzed solution after methylation, it is necessary to purify the reaction mixture after methylation by suitable means (e.g., by silica gel chromatography). Decarbamoylmitosanes produced by means of methylation as described above correspond to the decarbamoylmitosanes of Formula III wherein X is methoxy, Y is methoxy or hydroxy and Z is hydrogen or methyl. The decarbamoylmitosanes produced by means of methylation as described above may be treated with ammonia to convert the methoxy group at the 7-position into an amino group to produce 7-aminodecarbamoylmitosanes which correspond to the decarbamoylmitosanes of Formula III wherein X is amino, Y is methoxy or hydroxy and Z is hydrogen or methyl.

According to the third aspect of the invention, a process for preparing decarbamoylmitosanes of Formula III wherein X is methoxy or amino, Y is methoxy, hydroxy or hydrogen and Z is hydrogen or methyl is provided wherein a mitomycin of Formula I is reacted with lithium aluminum hydride. When a mitomycin of Formula I is reduced with lithium aluminum hydride, it has been found that the type of reaction product obtained is affected by the substituents Y and Z of the mitomycins of Formula I. For example, the mitomycin of Formula I wherein X is amino, Y is methoxy and Z is methyl produces the decarbamoylmitosane of Formula III wherein X is amino, Y is hydrogen and Z is methyl as the main product and a trace amount of the decarbamoylmitosane of Formula III wherein X is amino, Y is methoxy and Z is methyl when reduced with lithium aluminum hydride. Additionally, the decarbamoylmitosane of Formula III wherein X is methoxy, Y is hydrogen and Z is methyl is the main product and only trace amounts of decarbamoylmitosane of Formula III wherein X is methoxy, Y is methoxy and Z is methyl is produced when the mitomycin of Formula I wherein X is methoxy, Y is methoxy and Z is methyl is reduced with lithium aluminum hydride. The mitomycin of Formula I wherein X is methoxy, Y is hydroxy and Z is methyl can produce, upon reduction with lithium aluminum hydride, two types of reaction products, namely, the decarbamoylmitosane of Formula III wherein X is methoxy, Y is hydrogen and Z is methyl and the decarbamoylmitosane of Formula III wherein X is methoxy, Y is hydroxy and Z is methyl. The mitomycin of Formula I wherein X is methoxy, Y is methoxy and Z is hydrogen and the mitomycin of Formula I wherein X is amino, Y is methoxy, Z is hydrogen will both produce upon reduction with lithium aluminum hydride a decarbamoylmitosane of Formula III wherein Y is methoxy, Z is hydrozen and X is methoxy or amino depending upon the starting mitomycin.

According to the third aspect of the invention, a mitomycin of Formula I is dissolved in a suitable solvent such as tetrahydrofuran, ether, dioxane, dimethylformamide or any other solvent which is capable of dissolving mitomycins of Formula I and in which the reduction of the mitomycin by lithium aluminum hydride can be conducted. Lithium aluminum hydride in excess of the amount necessary to reduce all carbamoyl groups is then added to the mitomycin solution. Reaction is carried out at ambient temperature or at between ice-cooled and boiling temperature for a suitable period of time which may vary from several minutes to several hours. After the reaction is complete, residual lithium aluminum hydride and the produced complex compound of lithium aluminum are decomposed with aqueous ethyl acetate. The mixture is then subjected to oxidation by using a suitable oxidizing agent (e.g., potassium nitrosodisulfonate solution, air, ferric trichloride). Extraction of the reaction mixture with organic solvent and purification by means of a suitable method such as chromatography using silica gel yields a decarbamoylmitosane of Formula III wherein X is methoxy or amino, Y is methoxy, hydroxy or hydrogen and Z is hydrogen or methyl.

According to the fourth aspect of the invention, a process for preparing a decarbamoylmitosane of Formula III wherein X is methoxy or amino, Y is methoxy or hydroxy and Z is hydrogen or methyl is provided wherein a mitomycin of Formula I is reacted with an alkali metal alcoholate in an organic solvent. The advantages according to the present aspect of the invention include high yield, one step reaction and a process wherein the amino or methoxy group at the 7-position of the mitomycin of Formula I is not converted to hydroxy as is the procedure employed according to the second aspect of the invention. The alcoholate of a primary, secondary or tertiary alcohol may be employed as a nucleophilic reagent in an organic solvent (e.g., alcohol, tetrohydrofuran, dioxane, dimethylformamide, benzene). The reaction is preferably carried out at ambient temperature. Preferred reaction time is approximately eight (8) hours in methanol-benzene solution containing sodium methoxide, three (3) hours in isopropanol solution containing 2 N sodium isopropoxide and six (6) hours in isopropanol solution containing 2 N sodium isopropoxide. Dry Ice in excess of the quantity necessary to neutralize the solution is added to the reaction mixture to neutralize excess alkali and the reaction mixture is then concentrated in vacuo. The residue obtained after concentration is combined with acetone to extract the reaction product. The extract is concentrated and then purified, for example, by using silica gel chromatography to obtain crystalline decarbamoylmitosane of Formula III wherein X is methoxy or amino, Y is methoxy or hydroxy and Z is hydrogen or methyl.

According to the fifth aspect of the invention, acyl derivatives of decarbamoylmitosanes of the formula

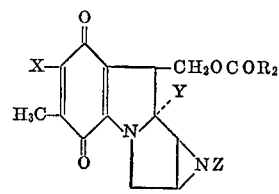

(VI)

are provided wherein X is methoxy or amino, Y is methoxy or hydroxy, Z is methyl or $R_2CO$ and $R_2$ is lower alkyl.

According to the sixth aspect of the invention, a process for preparing acyl derivative of decarbamoylmitosanes of Formula VI wherein X, Y, Z and $R_2$ are as defined according to the fifth aspect of the invention provided wherein a decarbamoylmitosane of Formula III wherein X is methoxy or amino, Y is methoxy or hydroxy and Z is hydrogen or methyl is subjected to acylation to convert the $CH_2OH$ group at the 9-position into a $CH_2OCOR_2$ group wherein $R_2$ is lower alkyl. Acylation is conducted by dissolving a decarbamoylmitosane of Formula III wherein X is methoxy or amino, Y is methoxy or hydroxy and Z is hydrogen or methyl in a suitable solvent and adding an acid halide or acid anhydride or by condensing the decarbamoylmitosane with lower carboxylic acid in the presence of a dehydrating condensing agent such as dicyclohexylcarbodiimide. Excess organic base is added to the reaction mixture for the purpose of preventing decomposition of the reaction product by acid which may be formed during the acylation reaction.

The decarbamoylmitomycins of Formula III wherein X, Y and Z are as defined according to the first aspect of the invention have, in general, lower antibiotic activity than the mitomycins of Formula I but they are still effective antibiotics. Additionally, they are useful intermediates in the production of other antibiotics (e.g., mitomycins of Formula I). The antibiotic activity of representative decarbamoylmitosanes of Formula III is set-forth in Table 2. This table sets-forth the minimum concentration of decarbamoylmitosane in $\gamma$/ml. of solution necessary to inhibit the growth of four representative types of pathogenic bacteria as determined by agar plate-dilution method.

TABLE 2

| X | Y | Z | Bacillus subtilus ATCC 6633 | Sartina lutea ATCC 10011 | Escherichia coli ATCC 14948 | Pseudomonas aerginosa ATCC 15246 |
|---|---|---|---|---|---|---|
| $CH_3O$ | $OCH_3$ | H | 0.78 | 1.58 | 0.195 | 3.125 |
| $CH_3O$ | $OCH_3$ | $CH_3$ | 3.125 | 3.125 | 6.25 | 6.25 |
| $CH_3O$ | OH | $CH_3$ | >25 | >25 | >25 | >25 |
| $CH_3O$ | H | $CH_3$ | >25 | >25 | >25 | >25 |
| $NH_2$ | $OCH_3$ | H | 0.195 | 3.125 | 6.25 | 1.56 |
| $NH_2$ | $OCH_3$ | $CH_3$ | 3.125 | 0.195 | >25 | >25 |
| $NH_2$ | H | $CH_3$ | >25 | >25 | >25 | >25 |

Table 3 discloses the antibiotic activity of representative decarbamoylmitosanes of Formula VI and the antibiotic activity of corresponding decarbamoylmitosanes of Formula III. The table sets-forth the minimum concentration of decarbamoylmitosanes in $\gamma$/ml. of solution necessary to inhibit the growth of two representative types of pathogenic bacteria.

TABLE 3

| X | Y | Z | R | Bacillus subtilus ATCC 6633 | Escherichia coli ATCC 14948 |
|---|---|---|---|---|---|
| $CH_3O$ | $CH_3O$ | H | H | 0.78 | 0.19 |
| $CH_3O$ | $CH_3O$ | $COCH_3$ | $COCH_3$ | 0.043 | 0.048 |
| $NH_2$ | $CH_3O$ | H | H | 0.195 | 0.781 |
| $NH_2$ | $CH_3O$ | $COCH_3$ | $COCH_3$ | 0.05 | 1.562 |
| $CH_3O$ | $CH_3O$ | $CH_3$ | H | 3.125 | 6.25 |
| $CH_3O$ | $CH_3O$ | $CH_3$ | $COCH_3$ | 0.04 | 0.78 |
| $NH_2$ | $CH_3O$ | $CH_3$ | H | 3.125 | >25 |
| $NH_2$ | $CH_3O$ | $CH_3$ | $COCH_3$ | 0.048 | 0.78 |
| $CH_3O$ | OH | $CH_3$ | H | 6.25 | >50 |
| $CH_3O$ | OH | $CH_3$ | $COCH_3$ | 0.78 | 12.5 |

Table 3 discloses that the antibiotic activity of the acyl derivatives of decarbamoylmitosanes of Formula VI is, in general, 10 to 50 times higher than the antibiotic activity of the corresponding decarbamoylmitosanes of Formula III.

The following non-limitative examples illustrate the invention. The identity of the products formed in the examples was determined by means of infrared spectrum analysis.

Example 1

Five hundred (500) milligrams of the mitomycin of Formula I wherein X is amino, Y is methoxy and Z is hydrogen were dissolved in 100 cc. of a 0.2 N methanolic solution (50% methanol; 50% water) of sodium hydroxide. The solution was allowed to stand for 16 hours at 30° C. Dry Ice was then added to the solution which had become bluish purple on standing to adjust the pH to 8.0. The solution was then dried in vacuo at a temperature above 40° C. to yield crude powder. Five (5) milliliters of water were added to the powder and the pH of the mixture was adjusted to 4.0 by adding hydrochloric acid. The solution was then extracted three times employing ethyl acetate. After dehydration with sodium sulfate, excess diazomethane dissolved in ether was added to the extract and the resulting mixture allowed to stand for about 30 minutes. The reaction mixture was then dried in vacuo and the reddish purple residue was dissolved in chloroform and subjected to adsorption chromatography on silica gel. Adsorption bands formed by developing with a 1:1 mixture of acetone and chloroform. The fractions of the first eluate were concentrated to give amorphous reddish purple powder. Infrared spectrum analysis of the amorphous reddish purple powder from the first eluate confirmed that the product was the decarbamoylmitosane of Formula III wherein X is methoxy, Y is methoxy and Z is hydrogen and that the absorption band (i.e., 1,700 cm.$^{-1}$) characteristic of the >C=O moiety of the

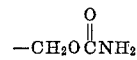

group had disappeared. The mitomycin starting material eluted second.

Example 2

Decarbamoylmitomycin of Formula III wherein X is methoxy, Y is methoxy and Z is hydrogen was produced as described in Example 1 except that the mitomycin of Formula I wherein X is amino, Y is methoxy and Z is hydrogen was employed as the starting material.

Example 3

The mitomycin of Formula I wherein X is methoxy, Y is methoxy and Z is methyl was treated in a similar manner to that described in Example 1 to yield a reddish purple needle crystalline form material which was identified as the decarbamolymitosane of Formula III wherein X is methoxy, Y is methoxy and Z is methyl.

Example 4

The mitomycin of Formula I wherein X is amino, Y is methoxy and Z is methyl was treated in a similar manner to that described in Example 1 to yield a reddish purple needle crystalline form material which was identified as the decarbamoylmitosane of Formula III wherein X is methoxy, Y is methoxy and Z is methyl.

Example 5

The mitomycin of Formula I wherein X is methoxy, Y is hydroxy and Z is methyl was treated in a similar manner to that described in Example 1 to yield a purple amorphous powder which was identified as the decarbamoylmitosane of Formula III wherein X is methoxy, Y is hydroxy and Z is methyl.

Example 6

The decarbamoylmitosane of Formula III wherein X is methoxy, Y is methoxy and Z is hydrogen obtained in Example 1 was dissolved in methanol and combined with excess ammonia. The mixture was allowed to stand at room temperature for 1 hour. The resultant bluish purple solution was concentrated in vacuo to give bluish purple needle crystals which were identified as the decarbamoylmitomycin of Formula III wherein X is amino, Y is methoxy and Z is hydrogen.

Example 7

The decarbamoylmitosane of Formula III wherein X is methoxy, Y is methoxy and Z is methyl obtained in Example 3 was treated in a similar manner to that described in Example 6 to yield bluish purple crystals which were identified as the decarbamoylmitosane of Formula III wherein X is amino, Y is methoxy and Z is methyl.

Example 8

One hundred (100) milligrams of the mitomycin of Formula I wherein X is methoxy, Y is hydroxy and Z is methyl were dissolved in 10 milliliters of anhydrous tetrahydrofuran and then combined with 80 milligrams of lithium aluminum hydride. The reaction was allowed to proceed with stirring at room temperature for one hour. After this the reaction mixture was combined with aqueous ethyl acetate to decompose excess lithium aluminum hydride and the complex compound of lithium aluminum. Immediately after this the reaction solution was poured into a solution prepared by dissolving 500 mg. of potassium nitrosodisulfonate in a mixture of 27 ml. of water and 14 ml. of 1/6 N $KH_2PO_4$. The color of the latter solution immediately turned to bluish purple. The bluish purple colored solution was extracted with chloroform and the extracted solution was dried by using anhydrous sodium sulfate. After the evaporation of the solvent, the residue was purified by means of partition chromatography using silica gel in which a mixture of benzene:acetone:water (8:2:5) was used as solvent.

Bluish fractions which were eluted first were collected and combined with acetone and ether whereby dark purple needlelike crystals were obtained (melting point: 147–149° C.). The obtained product was identified as the decarbamoylmitosane of Formula III wherein X is methoxy, Y is hydrogen and Z is methyl.

Purple fractions which were eluted second yielded purple powder instead of crystals. This purple powder was identified as the decarbamoylmitosane of Formula III wherein X is methoxy, Y is hydroxy and Z is methyl.

Small amounts of purple fractions which were eluted last were found to be the mitomycin starting material.

Example 9

A similar treatment to that described in Example 8 was carried out with the exception that air was used in place of potassium nitrosodisulfonate for oxidation. Similar products to those described in Example 8 were obtained with the exception that a considerable amount of yellowish substance which was regarded as byproduct was formed.

Example 10

A similar procedure to that described in Example 8 was employed with the exception that 100 mg. of the mitomycin of Formula I wherein X is methoxy, Y is methoxy and Z is methyl were used as the mitomycin starting material. Purification was carried out by means of column chromatography on silica gel wherein a mixture of chloroform and acetone (7:3) was used as eluant. Trace amounts of reddish purple fractions which were eluted first were identified as the decarbamoylmitosane of Formula III wherein X is methoxy, Y is methoxy and Z is methyl. Purple colored fractions eluted subsequently and were recrystallized by using acetone and petroleum ether to yield needle-like, dark purple crystals which were identified as the decarbamoylmitosane of Formula III wherein X is methoxy, Y is hydrogen and Z is methyl. Melting point: 147–149° C.

Example 11

A similar procedure to that described in Example 10 was repeated using 100 mg. of the mitomycin of Formula I wherein X is amino, Y is methoxy and Z is methyl as the mitomycin starting material. A trace amount of purple fraction which eluted first contained the decarbamoylmitosane of Formula III wherein X is amino, Y is methoxy and Z is methyl. Deep blue colored fractions eluted subsequently. Acetone was added to these deep blue colored fractions to give black prismic crystals having a melting point of 214–215° C. and which were identified as the decarbamoylmitosane of Formula III wherein X is amino, Y is hydrogen and Z is methyl.

Example 12

A similar procedure to that described in Example 8 was repeated using 100 mg. of the mitomycin of Formula I wherein X and Y are methoxy and Z is hydrogen as the mitomycin starting material. Purification was carried out by column chromatography on silica gel and a mixture of chloroform and acetone (7:3) was used as eluant. Reddish purple fractions which eluted first contained the decarbamoylmitosane of Formula III wherein X and Y are methoxy and Z is hydrogen. Reddish purple fractions which eluted subsequently contained the mitomycin starting material.

Example 13

A similar procedure to that described in Example 12 was repeated using 100 mg. of mitomycin of Formula I wherein X is amino, Y is methoxy and Z is hydrogen as the mitomycin starting material. Purple fractions eluted first and were found to contain the decarbamoylmitosane of Formula III wherein X is amino, Y is methoxy and Z is hydrogen. Purple fractions which eluted subsequently contained the mitomycin starting material.

Example 14

Five hundred (500) milligrams of mytomycin of Formula I wherein X is amino, Y is methoxy and Z is hydrogen were dissolved in 170 ml. of a 2 N methanolic solution of sodium methoxide and allowed to stand with stirring for 24 hours at room temperature. The resultant greenish blue solution was combined with Dry Ice until the greenish blue color changed to purple. The solution was concentrated to dryness at a temperature above 40° C. in vacuo to give a bluish green solid material which was extracted five (5) times with 60 ml. of acetone. The acetone extracts were collected and the combined extracts were concentrated to dryness to give a purple black pastelike residue. The residue was dissolved in a mixture of chloroform and acetone (1:2) and was adsorbed on a silica gel column. Developing with a mixture of acetone and chloroform (1:1) resulted in a purple adsorption band. The eluate of this adsorption band was concentrated to dryness, dissolved in a small amount of methanol and allowed to stand at room temperature to give purple needle crystals which were identified as the decarbamoylmitosane of Formula III wherein X is amino, Y is methoxy and Z is hydrogen. Infrared spectrum analysis of the purple needle crystals confirmed that the absorption band (i.e., 1,700 cm.$^{-1}$) characteristic of the >C=O moiety of the

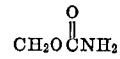

group had disappeared.

Example 15

The mitomycin of Formula I wherein X is amino, Y is methoxy and Z is methyl was treated in a similar manner to that described in Example 14 to yield purple needle crystals which were identified as the decarbamoylmitosane of Formula III wherein X is amino, Y is methoxy and Z is methyl. Melting point of the crystals: 165–167° C.

Example 16

Five hundred (500) milligrams of the mitomycin of Formula I wherein X is amino, Y is methoxy and Z is hydrogen were added to a mixture of 50 ml. of 2 N sodium isopropoxide and 85 ml. of isopropanol and the mixture was stirred for 3 hours at room temperature. The resultant greenish blue solution became purple colored on standing. The solution was concentrated to dryness in vacuo at a temperature above 40° C. to give a blue grey solid material. The material was extracted five (5) times with 60 ml. of acetone. The extracts were collected and concentrated to give a purple black paste-like residue. The residue was dissolved in a mixture of chloroform and acetone (1:2) and adsorbed on a silica gel column. Developing with a mixture of acetone and chloroform (1:1) resulted in a purple adsorption band. The main eluate was concentrated to dryness, dissolved in a small amount of methanol and allowed to stand at room temperature to give purple needle crystals. The crystals were identified as the decarbamoylmitosane of Formula III wherein X is amino, Y is methoxy and Z is methyl.

Example 17

Five hundred (500) milligrams of the mitomycin employed in Example 16 were dissolved in a mixture of 85 ml. of 4 N methanolic sodium methoxide and 85 ml. of benzene and stirred for 8 hours at room temperature. The resultant greenish blue solution was combined with Dry Ice and subsequently turned a purple color. The solution was concentrated to dryness in vacuo at a temperature above 40° C. to yield a bluish grey solid material. The solid material was extracted five (5) times with 60 ml. of acetone. The acetone extracts were collected and concentrated to dryness to give purple black paste-like residue. The residue was dissolved in a mixture of chloroform and acetone (1:2) and adsorbed on a silica gel column. Developing with a mixture of acetone and chloroform (1:1) resulted in a purple adsorption band. The main eluate was concentrated to dryness. The residue was dissolved in a small amount of methanol and allowed to stand at room temperature to give purple needle crystals. The crystals were identified as the decarbamoylmitosane produced in Example 16.

Example 18

One (1) gram of the mitomycin of Formula I wherein X is methoxy, Y is hydroxy and Z is methyl was dissolved in a mixture of 50 ml. of 3 N sodium methoxide methanol solution and 50 ml. of benzene and subjected to reaction with stirring for 20 hours at room temperature. After completion of the reaction, the mixture was combined with Dry Ice to neutralize the solution and the resultant sodium bicarbonate was removed by filtration. The filtrate was concentrated in vacuo and the residue was subjected to silica gel chromatography in a similar manner to that described in the previous examples. The amorphous powder product (426 mg.) was identified as the decarbamoylmitosane of Formula III wherein X is methoxy, Y is hydroxy and Z is methyl.

Example 19

Fifty (50) milligrams of the decarbamoylmitosane of Formula III wherein X is methoxy, Y is methoxy and Z is hydrogen were dissolved in 0.5 ml. of pyridine and combined with 0.5 ml. of acetic anhydride. The mixture was allowed to stand for about 1 hour at a room temperature. The reaction mixture was added to ice water to decompose the acetic anhydride and extracted with ethyl acetate. The extract was shaken with an aqueous solution of 10% NaHCO$_3$ to remove acetic acid. The ethyl acetate solution was dried with anhydrous sodium sulfate and concentrated to give 40 mg. of amorphous powder which was identified as the decarbamoylmitosane of Formula VI wherein X is methoxy, Y is methoxy, Z is R$_2$CO and R$_2$ is methyl.

Example 20

Fifty (50) milligrams of the decarbamoylmitosane of Formula III wherein X is amino, Y is methoxy and Z is hydrogen were dissolved in 0.5 ml. of pyridine and combined with 0.5 ml. of acetic anhydride and allowed to stand for about 1 hour. The reaction mixture was then poured into ice water and allowed to stand to decompose the acetic anhydride and then extracted with ethyl acetate. The extract was shaken with a 10% aqueous solution of NaHCO$_3$ to remove acetic acid. The ethyl acetate solution was dried with anhydrous sodium sulfate and concentrated to give the decarbamoylmitosane of Formula VI wherein X is amino, Y is methoxy, Z is R$_2$CO and R$_2$ is methyl.

Example 21

Fifty (50) milligrams of the decarbamoylmitosane of Formula III wherein X is amino, Y is methoxy and Z is methyl were dissolved in 5 ml. of dried tetrahydrofuran and combined with 1 ml. of triethylamine and 0.5 ml. of acetylchloride and allowed to stand for a night in a cold room. The reaction mixture was filtered to remove triethylamine hydrochloride and the filtrate was concentrated in vacuo to give 40 mg. of purple crystals which were identified as the decarbamoylmitosane of Formula VI wherein X is amino, Y is methoxy, Z is methyl and R$_2$ is methyl.

Example 22

Fifty (50) milligrams of the decarbamoylmitosane of Formula III wherein X is methoxy, Y is methoxy and Z is methyl were dissolved in 5 ml. of tetrahydrofuran and combined with 50 mg. of dicyclohexylcarbodiimide, 0.5 ml. of acetic acid and 0.5 ml. of pyridine and allowed to stand for 12 hours at room temperature. After filtering the precipitated dicyclohexylcarbamide, the filtrate was concentrated in vacuo and the residue was combined with a small amount of a mixture of petroleum ether and ether to remove unreacted dicyclohexylcarbodiimide. The residue was then dissolved in ethyl acetate and shaken with a 10% solution of NaHCO$_3$ to remove excess acetic acid and then concentrated in vacuo to give reddish purple crystals which were identified as the decarbamoylmitosane of Formula VI wherein X is methoxy, Y is methoxy, Z is methyl and R$_2$ is methyl.

Example 23

Fifty (50) milligrams of the decarbamoylmitosane of Formula III wherein X is methoxy, Y is hydroxy and Z is methyl were dissolved in a mixture of 5 ml. of pyridine and 3 ml. of acetic anhydride, allowed to stand for 30 minutes at room temperature and concentrated in vacuo to give 35 mg. of reddish purple needle crystals having a melting point of 184–186° C. which were identified as the decarbamoylmitosane of Formula VI wherein X is methoxy, Y is hydroxy, Z is methyl and R$_2$ is methyl.

We claim:
1. A process for preparing a compound of the formula

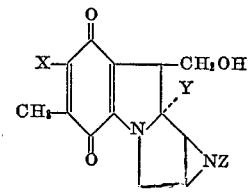

wherein
X is methoxy, or amino,
Y is methoxy, hydroxy or hydrogen, and
Z is hydrogen or methyl,
which comprises reducing a compound of the formula

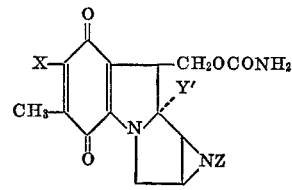

wherein
Y' is methoxy or hydroxy and
X and Z are as defined above, with lithium aluminum hydride in an organic solvent in which the reduction can be conducted and oxidizing the resultant product with an oxidizing agent selected from the group consisting of potassium nitrosodisulfonate solution, air, and ferric chloride; provided that Y is only hydrogen when Z is methyl.

2. The process of claim 1 wherein Y is methoxy or hydroxy.

3. The process of claim 1 wherein Y is hydrogen and Z is methyl.

References Cited

Gaylord: Reduction With Complex Metal Hydrides (1956), p. 636.

JOSEPH A. NARCAVAGE, Primary Examiner